United States Patent

Card et al.

[11] Patent Number: 5,887,990
[45] Date of Patent: Mar. 30, 1999

[54] VIRTUAL FONT CARTRIDGE

[75] Inventors: Charles Card, Agoura Hills; Stan Shurygailo, El Segundo; James Keeler, Thousand Oaks, all of Calif.

[73] Assignee: Dataproducts Corporation, Simi Valley, Calif.

[21] Appl. No.: 722,527

[22] Filed: Sep. 27, 1996

Related U.S. Application Data

[63] Continuation of Ser. No. 216,091, Mar. 22, 1994, abandoned, which is a continuation of Ser. No. 849,746, Mar. 12, 1992, abandoned.

[51] Int. Cl.⁶ ........................................... B41J 5/30
[52] U.S. Cl. ........................ 400/61; 400/76; 395/110
[58] Field of Search ................... 400/61, 70, 76; 395/110, 150

[56] References Cited

U.S. PATENT DOCUMENTS

| | | | |
|---|---|---|---|
| 4,686,525 | 8/1987 | Nagata | 395/110 |
| 5,050,098 | 9/1991 | Brown | 395/112 |
| 5,093,903 | 3/1992 | Sudoh | 395/110 |
| 5,138,696 | 8/1992 | Nagata | 395/110 |
| 5,142,614 | 8/1992 | Schneider | 395/110 |
| 5,148,293 | 9/1992 | Miyachi | 395/110 |
| 5,167,013 | 11/1992 | Hube | 395/110 |
| 5,206,736 | 4/1993 | Simpson | 400/61 |
| 5,288,155 | 2/1994 | Suzuki | 400/83 |
| 5,562,350 | 10/1996 | Sakurai | 400/76 |

FOREIGN PATENT DOCUMENTS

| | | | |
|---|---|---|---|
| 0356104 | 8/1989 | European Pat. Off. | |
| 2182471 | 5/1987 | United Kingdom | 400/76 |

OTHER PUBLICATIONS

Microsoft Users Reference Manual 1990 pp. 123–125.
Hewlettt Packard, *HP PCL 5 Printer Language Technical Reference Manual*, © 1990, USA; Chapters 7, 8 and 9.

*Primary Examiner*—John Hilten
*Attorney, Agent, or Firm*—Pillsbury Madison & Sutro LLP

[57] ABSTRACT

Methods and apparatus for emulating font cartridges with virtual cartridges. Virtual cartridges may be loaded onto a data storage device, and desired virtual cartridges may be selected for use from those stored.

18 Claims, 5 Drawing Sheets

VIRTUAL CARTRIDGE TABLE 53

| 53a<br><cartridge name> | 53b<br><path> |
|---|---|
| Courier | \vfonts\courier |
| Chicago Times | \vfonts\cgtimes |
| Sans Serif | \vfonts\sserif |
| Universal | \vfonts\univers |

FIG. 4

SLOT TABLE 54

| 54a<br>Slot | 54b<br><cartridge name> |
|---|---|
| Slot - 1 | Chicago Times |
| Slot - 2 | Courier |
| Slot - 3 | Null |

VIRTUAL FONT CARTRIDGE

This is a continuation of application Ser. No. 08/216,091 filed on Mar. 22, 1994, now abandoned, which is a continuation of application Ser. No. 07/849,746, filed Mar. 12, 1992, now abandoned.

BACKGROUND OF THE INVENTION

1. Field of the Invention

This invention relates generally to the field of printers and more specifically to printers capable of printing in more than one font.

2. Description of Related Art

Early printers were originally based upon the technology of typewriters. As typewriter technology developed, so too did printer technology. However, these early printers and typewriters were typically limited to a single typeface having fixed attributes including spacing, height, pitch, style, stroke weight, symbol set, and orientation. Special capabilities, such as underlining or bolding, often could only be performed by the printer by backing up and restriking. In more advanced typewriters, the typeface could be changed by physically removing a component, usually a ball or a wheel, that bore every printable character.

Later printers, e.g. laser printers, diverged from typewriter technology. These printers did not have a set typeface, but could print a variety of typefaces having a range of attributes. The computer attached to a printer must be able to communicate to the printer as to how the printer should print. These printer instructions typically identify a "font" which is a set of characters that have similar attributes. A font has an assigned name, typeface, and is described by its format (bitmap or scalable), spacing (fixed or proportional), height, pitch, style (e.g. italic), stroke weight (e.g. bold), symbol set (e.g. English, mathematical), and orientation (e.g. portrait, landscape).

Typically, when a computer instructs an attached printer to print a document, the computer communicates to the printer which font to use and the information to be printed. In a popular application, the computer communicates, not a font's name, but the desired font's attributes. Next, the printer selects the appropriate font having the desired attributes from those it has available. To make the selection, the printer has a data processor (e.g. microprocessor) that utilizes a set of instructions called printer logic. The data processor also performs other functions, including printer initialization, output synthesis, and error handling.

Fonts are typically available to the data processor from a Font List which is usually a predetermined memory address space in which the fonts are located. The font that will be used by the printer is selected from the Font List by the data processor by finding the best fit based upon the attributes that are sent from the computer. Of course, printing of the document as requested by the computer requires that the printer have the desired font available. Also, more than one font in the Font List may have the desired attributes. However, only one font may be selected at a time. It is the data processor that makes the selection.

Printers generally have fonts available from three sources- resident, downloaded or cartridges. Resident fonts, also known as internal fonts, are fonts which are manufactured into the printer. Typically, resident fonts are stored in read-only memory (ROM). ROMs are well known to those skilled in the art. Downloaded fonts are fonts which are transferred into the printer's user random access memory (RAM) from the host computer. RAM is well known to those skilled in the art. A font cartridge is a removable media containing multiple fonts that, like resident fonts, are typically stored in ROM. When a cartridge is plugged into a slot in a printer, the printer has access to the fonts contained in the cartridge. A printer may have more than one slot for cartridges.

As discussed, resident fonts typically are stored in ROM. However, resident fonts may also be stored in the printer on a hard disk or other non-volatile rewritable storage device. Generally, when the printer is first powered on the data processor performs an initialization routine that includes transferring the resident fonts from the hard disk to the Font List in memory. In this case, the resident fonts are transferred to printer RAM at predefined memory addresses.

Previously, printers have often resolved font selection conflicts by assigning priority to the source of the fonts. Font selection conflicts arise when more than one font in the Font List matches the attributes sent by the host computer. Downloaded fonts generally have the highest priority, next cartridge fonts, last resident fonts. If there is more than one slot in the printer for cartridges, the slots are given separate priorities. The user controls the font selection by providing downloadable fonts and/or installing cartridges into the slots.

Printers typically have initialization procedures. The printer initializes whenever the power is cycled, or may initialize in response to a front panel control or external command. Initialization procedures typically include procedures for recognizing resident and cartridge fonts. Typically, after power has been cycled or during printer initialization, downloaded fonts are removed. It is also possible to selectively delete downloaded fonts from printer memory through special initialization commands. When resident fonts are stored on a hard disk in the printer, initialization generally includes loading of the resident fonts into memory.

Cartridges have many drawbacks. They are generally expensive. Repeated insertion and removal can deteriorate the electrical connections between a cartridge and its socket in the printer. Typically, a printer will have only one or two cartridge slots. This means that there is little versatility in the sizes and varieties of fonts that can be used.

Downloadable fonts also have disadvantages. A downloadable font is typically downloaded each time the printer needs it. Downloading a font from a computer to the printer is time consuming. Downloadable fonts occupy substantial computer storage space, and more importantly, substantial printer storage and memory space. If the printer is connected to a computer network, it is desirable that every computer on the network be able to download the desired fonts. Downloadable fonts also can be difficult to update, since every computer must be updated, and each computer may have downloadable fonts in different directories.

Resident fonts also have disadvantages. Resident fonts stored in ROM may only be changed by removing the ROM chips and replacing them. Generally, ROMs are fragile, and removal and replacement may damage the ROMs or the printer. Furthermore, such removal and replacement can be inconvenient, and may require a skilled technician. Even when resident fonts are stored on a hard disk in the printer, updates are difficult to perform.

SUMMARY OF THE INVENTION

It is an object of the present invention to provide an improved font loading, storage and selection system for printers, obviating for practical purposes the above-mentioned limitations, particularly in a manner requiring uncomplicated electronic arrangement.

These and other objects and advantages are achieved in a printer which, in accordance with a preferred embodiment of the present invention, has fonts stored internally in a manner similar to that of resident fonts and yet assigned a selection priority as if the fonts were stored in cartridges. As explained in greater detail below, these fonts are stored in "virtual cartridges" which are actually on the hard disk or other memory of the printer or computer system.

BRIEF DESCRIPTION OF THE DRAWINGS

FIG. 4 is an example of a Virtual Cartridge Table in a printer employing virtual cartridges.

FIG. 5 is an example of a Slot Table in a printer employing virtual cartridges.

DESCRIPTION OF THE PREFERRED EMBODIMENT

In accordance with one aspect of the present invention, physical font cartridges are replaced with "virtual font cartridges." As used herein, the term "virtual cartridge" refers to a collection of fonts as normally found on a cartridge, except that herein the fonts are stored in the printer's nonvolatile memory. As explained in greater detail below, once a virtual cartridge is mounted, the virtual cartridge emulates a cartridge.

First Preferred Embodiment

Figure 1:
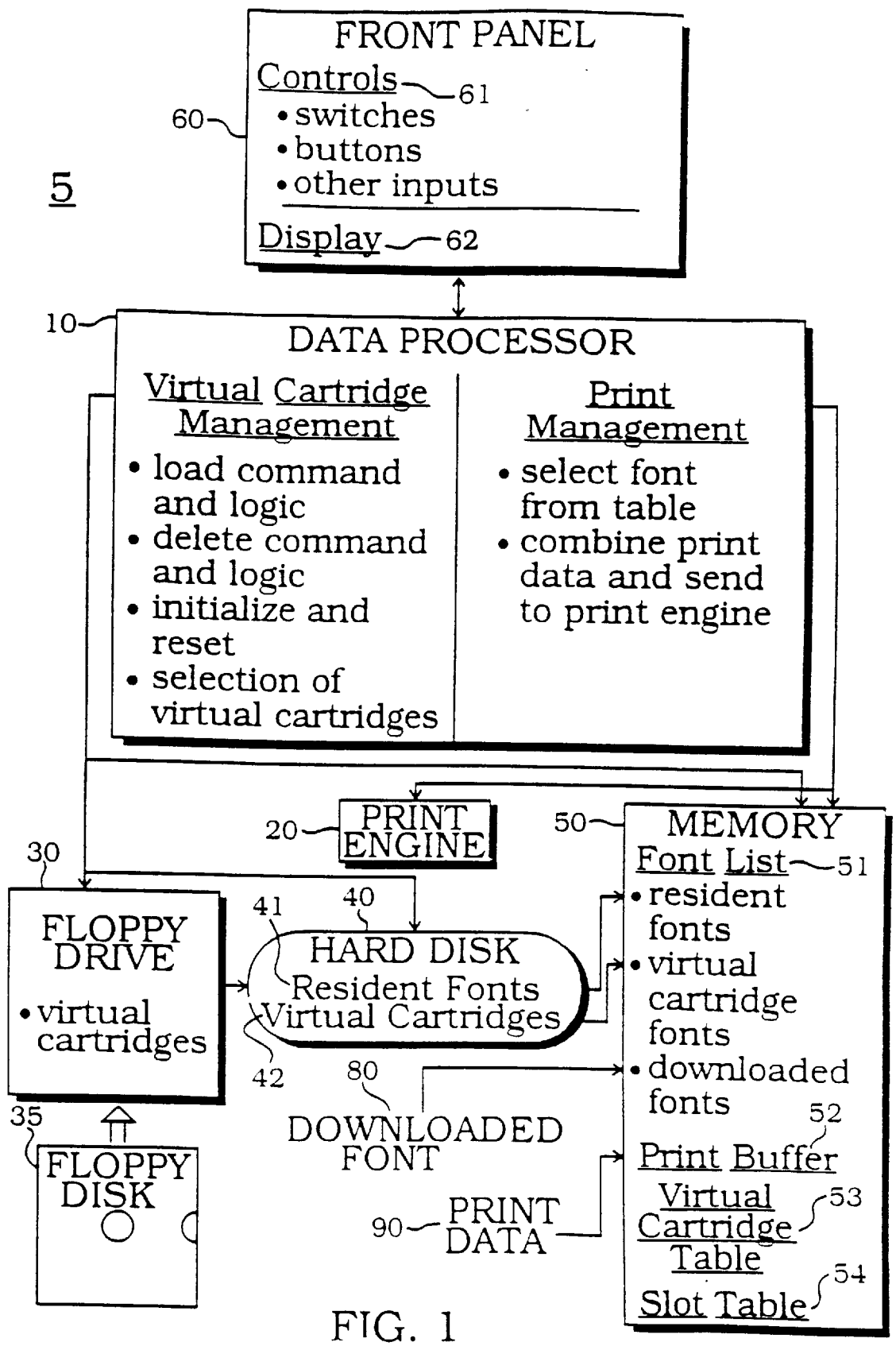
FIG. 1 is a schematic block diagram of one embodiment of a printer employing virtual cartridges.

Referring now to FIG. 1, there is shown a printer 5 which includes a data processor 10 connected to a floppy drive 30, a hard disk 40, a memory 50, a front panel 60, and a print engine 20. The mechanisms of the first illustrated embodiment that permit virtual cartridges to emulate cartridges include the hard disk 40 and floppy drive 30 for storage of the virtual cartridges; a data processor 10 to control the other components, including Virtual Cartridge Management Logic for managing the virtual cartridges on the hard disk 40, floppy drive 30, and in memory 50, and Print Management Logic for performing the print operations; the memory 50 to store in a Font List 51 all fonts selected by the user, a Print Buffer for assembling the print data 90 to be delivered to the Print Engine 20, a Virtual Cartridge Table 53 to store a list of the virtual cartridges on the hard disk 40, and a Slot Table 54 to store a list of the mounted virtual cartridges; and a front panel 60 including controls 61 for accepting user input and display 62 for displaying status information and virtual cartridge names.

In the first illustrated embodiment, virtual cartridges are initially loaded from a removable non-volatile data storage device, such as a floppy disk 35 in the appropriate operating system file format, such as MS-DOS format. Of course, other file formats may be used, such as Macintosh, Unix, VMS, etc. The virtual cartridges are then transferred and stored in a non-volatile read-write data storage device such as a hard drive 40. In the first preferred embodiment, virtual cartridges are segregated on the hard disk 40 in a predetermined directory (e.g. "\vfonts" in MS-DOS format as shown in FIG. 4).

The data storage device need only support a file system. Therefore, devices such as floppy drives, RAMs, tape drives, CD-ROMs, magneto-optical disks, etc. may also be used. Preferably, the particular embodiment, to identify particular cartridges, relies upon the cartridge's name wherever possible rather than, for example, its location. This permits even greater data storage device independence.

In another embodiment, virtual cartridges are communicated to the printer from an external connection, similarly to downloaded fonts. However, the virtual cartridges would be given priorities as if they were cartridges, as is discussed below. In fact, nearly any method for delivering the virtual cartridges may be used, such as magnetic tapes, CD-ROMs, or physical font cartridges.

Figure 2:
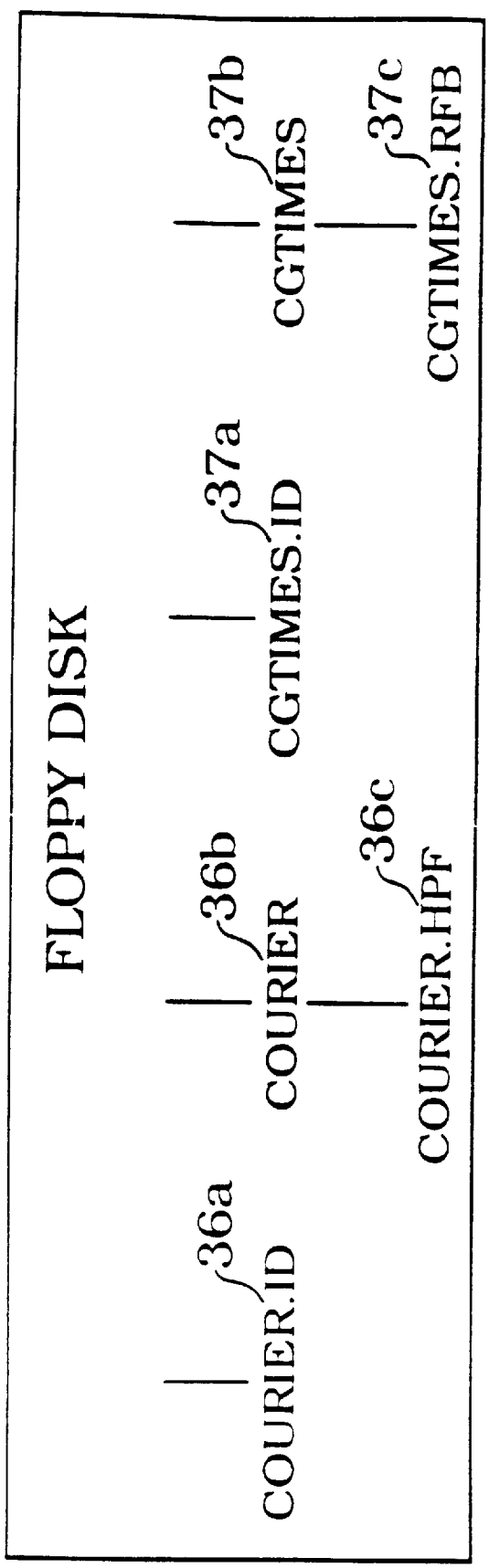
FIG. 2 is a diagrammatic example of a floppy disk for use with a printer employing virtual cartridges.

Referring to FIG. 2, there is shown a diagrammatic example of a floppy disk 35 for use with a printer employing virtual cartridges. In this example, the floppy disk 35 contains identification (ID) files 36a and 37a, subdirectories 36b and 37b, and fonts files 36c and 37c. The floppy disk 35 can contain more than one virtual cartridge. In this example, the floppy disk 35 contains two virtual cartridges. Each virtual cartridge comprises an ID file (e.g. "COURIER.ID" 36a), and a subdirectory (e.g. "COURIER" 36b), with the fonts being stored in a single file in the subdirectory (e.g. "COURIER.HPF" 36c).

In the first preferred embodiment, there is an ID file 36a, 37a on the floppy disk 35 for each virtual cartridge stored thereon. In this example, the eight character MS-DOS file name of the ID file 36a, 37a is the same name as that of the subdirectory 36b, 37b but with the extension "ID". The ID file 36a, 37a contains identification information for the associated virtual cartridge stored in fields. In the first illustrated embodiment, the ID file 36a, 37a contains identification information in the following fields:

FONTS
<cartridge name>
<copyright information>
<any other useful information, for example, a list of the fonts contained in the font file>

These fields are syntactically separated.

In the first preferred embodiment, only the ID field "FONTS" and the <cartridge name> field are used by the printer. The other fields are informational only. The name associated with a virtual cartridge and stored in the <cartridge name> field is used in the first preferred embodiment to select the virtual cartridge from the front panel display 62 for loading to the hard disk 40 or transfer to memory 50. This is discussed more fully below.

With regards the fonts file 36c, 37c, the name of the fonts file 36c, 37c stored in the subdirectory 36b, 37b is preferably the same as that of the ID file 36a, 37a but with a different extension. The extension indicates the format of the fonts that the fonts file 36c, 37c contains. In the first preferred embodiment, the fonts file 36c, 37c contains all of the fonts of a corresponding cartridge.

The virtual cartridge could be embodied as a single file. In such an embodiment, the ID file and fonts file would be combined, and there would be no subdirectory. Such an embodiment would be preferred where a communications line is used instead of a floppy drive for loading virtual cartridges.

Alternatively, the ID file could include a list of the locations or descriptions of font files on the data storage device. In this alternative embodiment, each font file would include a single font. Preferably, all font files for all virtual cartridges would be stored in a single subdirectory. As can be seen, this alternative would allow the virtual cartridges to share font files. This embodiment could provide space savings on the data storage devices—the floppy disk 35 and hard disk 40.

The hard disk 40 can store more virtual cartridges than can be accommodated by the Font List 51 and the Print Management Logic in the data processor 10. In the first preferred embodiment, up to three virtual cartridges may be made available to the Print Management Logic at a time. The number of slots for virtual cartridges is based upon the available memory space 50 in the printer 5. The names and locations of the virtual cartridges are stored in the Virtual Cartridge Table 53.

The Virtual Cartridge Table 53 is maintained by the Virtual Cartridge Management Logic in the data processor 10. The Virtual Cartridge Table 53 is created in memory 50 when the printer 5 is initialized. As shown in FIG. 4, the Virtual Cartridge Table 53 maintains a list of the virtual cartridges on the hard disk 40. The Virtual Cartridge Table 53 preferably includes two fields for each virtual cartridge on the hard disk 40: "<cartridge name>" 53a and "<path>" 53b. The <cartridge name> field 53a is the same name as that in the ID file. The <path> field 53b is the directory path where the virtual cartridge is located on the hard disk 40.

The mounted virtual cartridges, i.e. the virtual cartridges that have been selected to be made available to the Print Management Logic, are listed in the Slot Table 54. In the example shown in FIG. 5, the Slot Table 54 stores the <cartridge name> field 54b from the Virtual Cartridge Table 53 (53a in FIG. 4). However, any other reference to virtual cartridges may be used, such as the <path> field 53b of the Virtual Cartridge Table 53. The Slot Table 54 is also maintained by the Virtual Cartridge Management Logic in the data processor 10 and created when the printer 5 is initialized. As shown in FIG. 5, the Slot Table 54 maintains a list of which, if any, virtual cartridges have been mounted in each slot. For each virtual cartridge listed in the Slot Table 54, that virtual cartridge's fonts are in the Font List 51. If a slot 54a is empty, that is, if no virtual cartridge has been mounted to that slot, the value in the <cartridge name> field 54b is "NULL" (or some value desired to have that meaning).

The slots 54a in the Slot Table 54 have priority amongst themselves. For example, the fonts in the virtual cartridge mounted in Slot-1 may have the highest priority of the virtual cartridges, and the fonts in a virtual cartridge mounted in Slot-3 the lowest priority.

The Font List 51, Virtual Cartridge Table 53, Slot Table 54 and Print Management Logic are discussed more fully below. The methods of implementing and using tables and lists in memories are well known to those skilled in the art.

Figure 3:
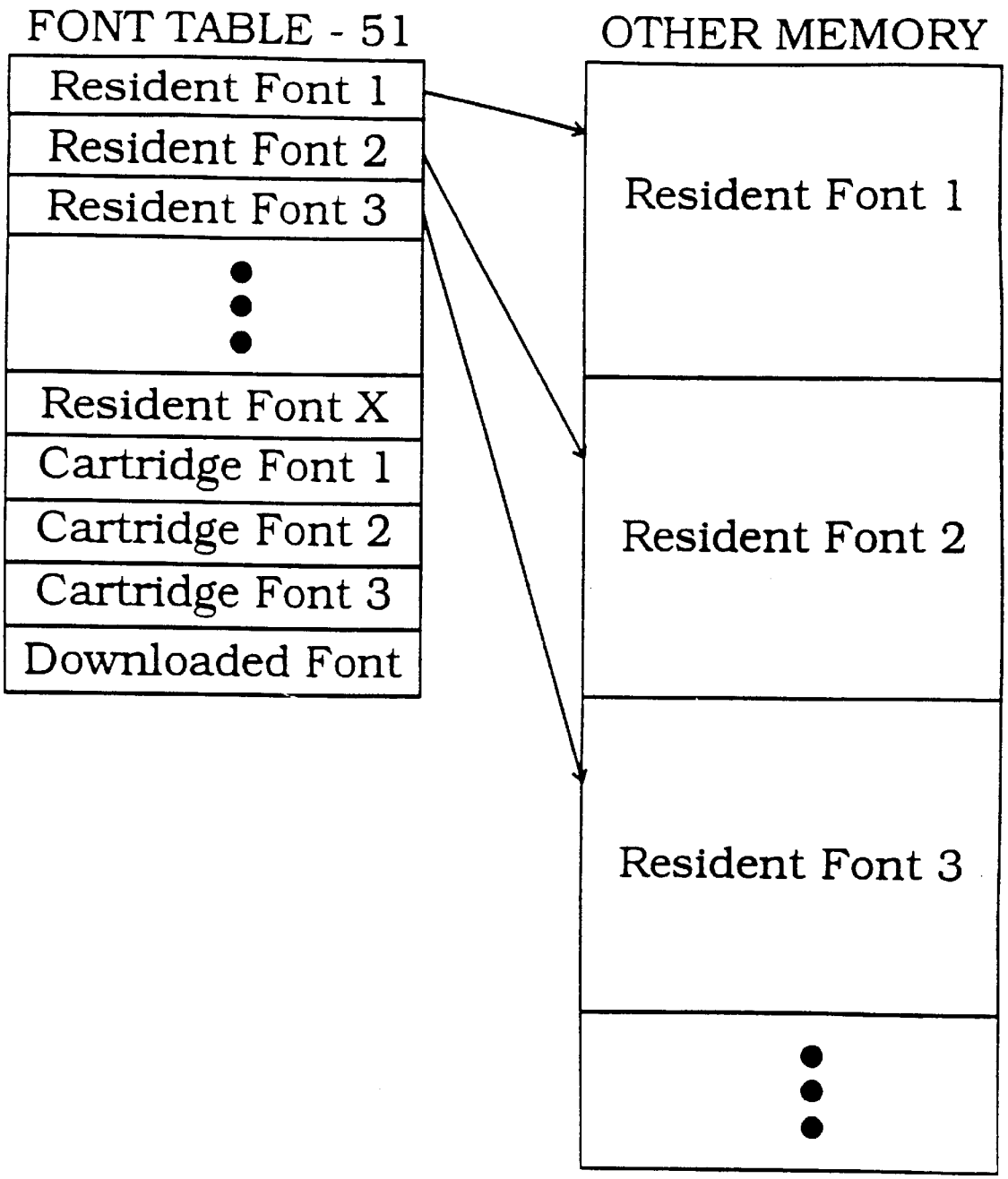
FIG. 3 is an example of a memory map of a printer.

As set forth above and shown in FIG. 3, the Font List 51 is a list of the fonts that may be readily accessed by the Print Management Logic of the data processor 10. In the first illustrated embodiment, fonts are accessed using indirect methods well known in the art. That is, the fonts are accessed through address pointers to the memory storage location of the fonts stored in memory 50. However, the Font List 51 may also be implemented using direct memory accessing. Use of pointers is well-known in the art.

As discussed, the Print Management Logic of the data processor 10 accesses fonts from the Font List 51. The Font List 51 holds resident fonts and downloaded fonts as well as virtual cartridge fonts. Resolution of font selection conflicts is performed as is known in the art through the priorities associated with the sources of the fonts, including the slot if applicable. Once a font is loaded from a virtual cartridge on the hard disk 40 to the Font List 51, the emulation of a physical cartridge is complete. In other words, the Print Management Logic of the data processor 10 accesses the virtual cartridge fonts as if they were cartridge fonts. The portion of the Font List 51 that would have comprised ROMs in a cartridge instead comprises RAM in memory 50.

Referring again to FIG. 1, the data processor 10 includes Virtual Cartridge Management Logic and Print Management Logic. The Virtual Cartridge Management Logic includes commands for:

1. Loading a virtual cartridge from a floppy disk 35 in the floppy drive 30 to the hard disk 40.
2. Deleting virtual cartridges from the hard disk 40.
3. Initializing and resetting the Font List 51, the Virtual Cartridge Table 53 and the Slot Table 54 in the memory 50.
4. Mounting virtual cartridges.
5. Unmounting virtual cartridges.

The Print Management Logic includes command for:

1. Selecting a font from the Font List 51 based upon the attributes in the print data 90 sent by the host computer.
2. Combining print data 90 with the selected font to produce print output.
3. Outputting via the print engine 20.

The Front Panel 60 has two parts—controls 61 and display 62. The controls 61 may be any commonly used input controls, such as switches and buttons. Other forms of input controls are well known in the art. The display 62 may be any device for communicating information to the user or external control mechanism. Such displays are also well known in the art. Information to be displayed by the present invention include virtual cartridge names and status information of the components of the printer. The display 62 may display easily identifiable English words, codes, or the like.

Embodiments of the present invention may replace or complement the front panel 60 with connections to external input and output mechanisms. For example, user control input and printer display output could be accomplished via the host computer. In that case, the user or a control program running in the host computer would send instructions to the printer, and receive information back to be displayed on the host computer's monitor or utilized by a control program. Control of the printer through the host computer would be communicated via escape sequences, as is known in the art.

The print engine 20 may be any of those print engines well known in the art. The memory 50 in the first preferred embodiment is of sufficient size to store the Font List 51, Virtual Cartridge Table 53 and Slot Table 54 while also having sufficient space for the print buffer 52.

Loading a Virtual Cartridge from a Floppy Disk to the Hard Disk

In the first preferred embodiment, the following process is exemplary of a process used to load a virtual cartridge stored on a floppy disk 35 to the hard disk 40.

(1) The floppy disk 35 is inserted into the floppy drive 30.
(2) The user indicates via the front panel controls 61 that a virtual cartridge is to be loaded.
(3) In response to (2), the data processor accesses the floppy disk 35 in the floppy drive 30, scanning for ID files.
(4) Upon locating an ID file, the data processor 10 causes the cartridge name stored in the ID file to be displayed on the front panel display 62. Depending upon the size of the front panel display 62, one or more virtual cartridge names may be displayed at once.
(5) The user selects the virtual cartridge displayed. Of course, the virtual cartridge names can be scrolled until the desired virtual cartridge is located.
(6) In response to (5), the data processor 10 accesses the floppy disk 35, and copies the virtual cartridge to the predetermined directory on the hard disk 40. That is, the ID file is copied to the predetermined directory on the hard disk, a subdirectory is also created there, and the fonts file is copied to the new subdirectory.

(7) The data processor 10 updates the Virtual Cartridge Table 53 to include an entry of the loaded virtual cartridge.

Mounting a Virtual Cartridge

In the first preferred embodiment, the following process is exemplary of a process used to mount a virtual cartridge stored on the hard drive 40. Once a virtual cartridge is mounted, the fonts from that virtual cartridge are added to the Font List 51.

(1) The user indicates via the front panel controls 61 that a virtual cartridge is to be mounted.

(2) The user selects into which slot the virtual cartridge will be mounted. Upon selection of the slot, the name of the virtual cartridge then mounted in the slot, if any, is displayed.

(3) In response to (2), the data processor accesses the Virtual Cartridge Table 53 and displays the cartridge names on the front panel display 62. Depending upon the size of the front panel display 62, one or more virtual cartridge names may be displayed at once.

(4) The user selects a virtual cartridge. Of course, the virtual cartridge names can be scrolled until the desired virtual cartridge is located.

(5) In response to (4), the data processor 10 accesses the hard disk 40, and copies the virtual cartridge fonts into the Font List 51 in the memory 50.

(6) The data processor 10 updates the Slot Table 54 to reflect the mounting of the virtual cartridge in the selected slot.

In an alternative embodiment, the Virtual Cartridge Table 53 may be omitted. In this embodiment, mounting a virtual cartridge would involve accessing the hard disk 40 to scan for ID files. Upon locating an ID file, the data processor 10 would cause the virtual cartridge name stored in the ID file to be displayed. The remaining steps of the procedure would follow as explained.

Initializing the Printer

In the first preferred embodiment, printer initialization includes steps for remounting previously mounted virtual cartridges. As discussed, when a virtual cartridge is mounted, the Virtual Cartridge management Logic updates the Slot Table 54 to reflect the selection. During initialization, the Virtual Cartridge Management Logic creates the Virtual Cartridge Table 53 and Slot Table 54 and loads the fonts of virtual cartridges selected as indicated in the Slot Table 54 from the hard disk 40 to the Font List 51. Since turning off or resetting the printer would normally eliminate the Virtual Cartridge Table 53 and Slot Table 54 in memory 50, the values stored in the tables should also be stored in non-volatile memory such as on the hard disk 40. It will be seen by those skilled in the art that the Virtual Cartridge Table 53 and Slot Table 54 may also be implemented in non-volatile memory.

Second Preferred Embodiment

The configuration of the second preferred embodiment is similar to that of the first preferred embodiment. The major difference is that in the second preferred embodiment, the data storage device is ROM. That is, virtual cartridges are stored in printer ROM, rather than on the hard disk or floppy disk of the first preferred embodiment. In this embodiment, the printer may have a very large number of built-in fonts. Some of these built-in fonts may have identical font selection characteristics and yet be visibly different when utilized. By utilizing virtual font cartridges, otherwise unresolvable ambiguities between two fonts may be resolved.

Figure 6:
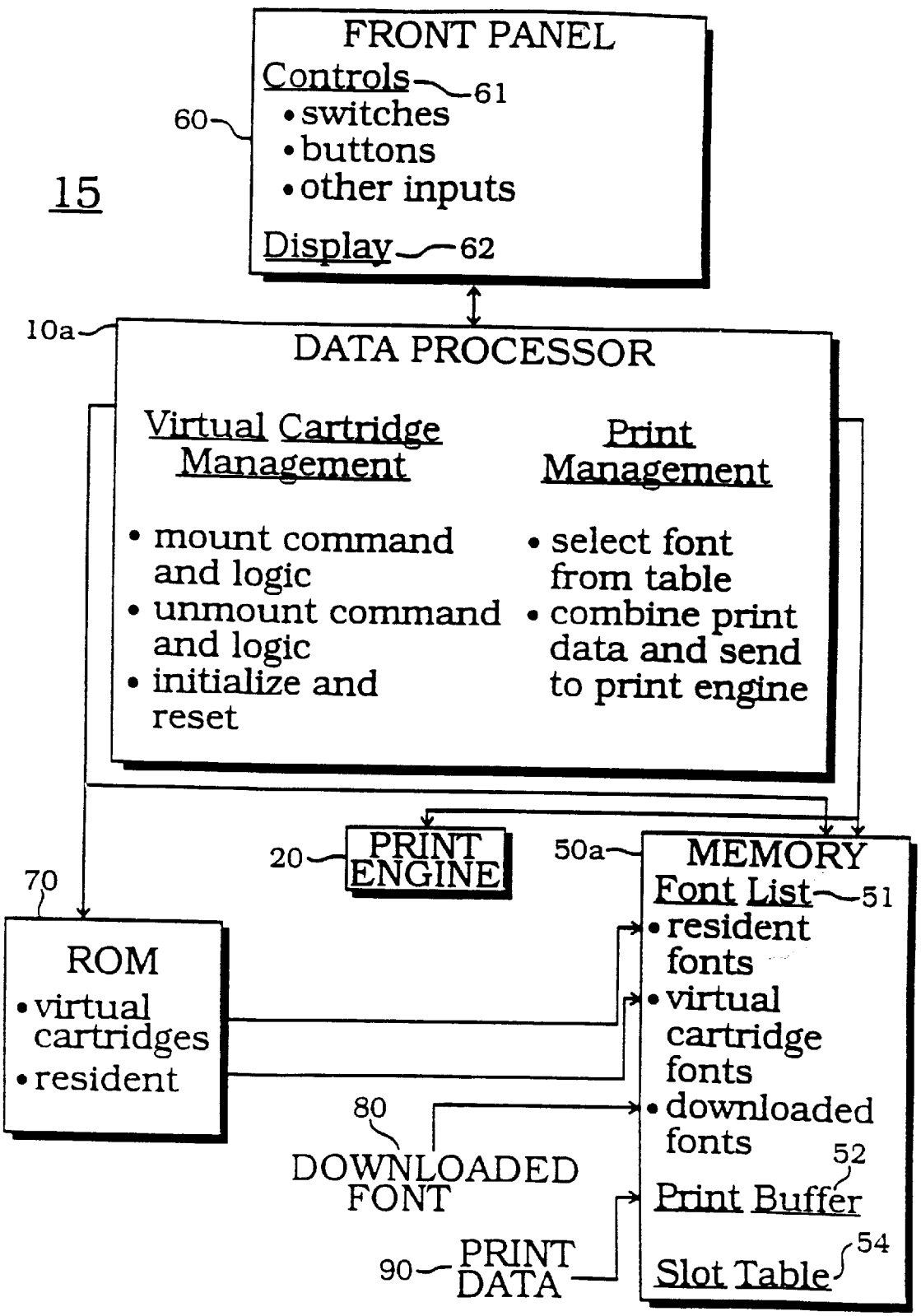
FIG. 6 is a schematic block diagram of another embodiment of a printer employing virtual cartridges.

Referring now to FIG. 6, there is shown a printer 15 which includes a data processor 10*a* connected to a ROM 70, a memory 50*a*, a front panel 60, and a print engine 20. As can be seen, the hard disk 40, floppy disk 35 and floppy drive 30 of FIG. 1 are replaced by ROM 70 in FIG. 6.

Other components are also simpler in the second preferred embodiment. The Virtual Cartridge Management Logic of the data processor 10*a* need only manage the slot assignments of the virtual cartridges. The memory 50*a* has a Font List 51 to store a list of the fonts available to the user, a Print Buffer for assembling the print data 90 to be delivered to the Print Engine 20, and a Slot Table 54 to store a list of the mounted virtual cartridges.

In the second illustrated embodiment, virtual cartridge fonts are stored in ROM. These ROM-based fonts are used for both resident fonts and virtual cartridge fonts. The virtual cartridges of the second preferred embodiment include both fonts and identification information (e.g. "<cartridge name>"). The Font List 51, rather than storing actual fonts, instead stores font addresses. For virtual cartridge fonts and resident fonts, these addresses are to printer ROM 70. For downloaded fonts, the addresses are to printer memory 50*a*. Virtual cartridges available through the Font List 51 are said to be "mounted."

In the second preferred embodiment, the ROM 70 is an EEPROM. As is known in the art, an EEPROM may be erased and rewritten. Therefore, virtual cartridges may be added, deleted, or updated through the communication channel to the host computer.

Much like in the first preferred embodiment, the mounted virtual cartridges, i.e. the virtual cartridges that have been selected to be made available to the Print Management Logic, are listed in the Slot Table 54. Referring again to FIG. 5, the Slot Table 54 stores the <cartridge name> field 54*b*. The Slot Table 54 is maintained by the Virtual Cartridge Management Logic in the data processor 10*a* and created when the printer 15 is initialized. As shown in FIG. 5, the Slot Table 54 maintains a list of which, if any, virtual cartridges have been mounted in each slot. For each virtual cartridge listed in the Slot Table 54, that virtual cartridge's fonts are available through the Font List 51. If a slot 54*a* is empty, that is, if no virtual cartridge has been mounted to that slot, the value in the <cartridge name> field 54*b* is "NULL" (or some value desired to have that meaning). As in the first preferred embodiment, the slots 54*a* in the Slot Table 54 have priority amongst themselves.

As set forth above and shown in FIG. 3, the Font List 51 is a list of the fonts that may be readily accessed by the Print Management Logic of the data processor 10*a*. As mentioned, in the second illustrated embodiment, fonts are accessed using indirect methods. However, the Font List 51 may also be implemented using direct memory accessing. Furthermore, the virtual cartridges may be either a group of fonts in ROM or a list of pointers to fonts in ROM. The latter embodiment permits virtual cartridges to, in essence, share fonts.

As discussed, the Print Management Logic of the data processor 10*a* accesses fonts from the Font List 51. Resolution of font selection conflicts is performed as is known in the art through the priorities associated with the sources of the fonts, including the slot if applicable. Once a virtual cartridge is mounted, the emulation of a physical cartridge is complete. In other words, the Print Management Logic of the data processor 10 accesses the virtual cartridge fonts as if they were cartridge fonts. The portion of the Font List 51 that would have comprised ROMs in a cartridge instead comprises ROM 70 in the printer.

Referring again to FIG. 6, the data processor 10 includes Virtual Cartridge Management Logic and Print Management Logic. The Virtual Cartridge Management Logic includes commands for:

1. Mounting a virtual cartridge.
2. Unmounting virtual cartridges.
3. Initializing and resetting the Font List 51 and the Slot Table 54 in the memory 50a.

The Print Management Logic includes command for:
1. Selecting a font from the Font List 51 based upon the attributes in the print data 90 sent by the host computer.
2. Combining print data 90 with the selected font to produce print output.
3. Outputting via the print engine 20.

The Front Panel 60 and print engine 20 have similar configurations and functionalities as in the first preferred embodiment. The memory 50a in the second preferred embodiment is of sufficient size to store the Font List 51 and Slot Table 54 while also having sufficient space for the print buffer 52.

Mounting a Virtual Cartridge

In the second preferred embodiment, the following process is exemplary of a process used to mount a virtual cartridge stored in ROM 70. Once a virtual cartridge is mounted, the fonts from that virtual cartridge are available through the Font List 51.

(1) The user indicates via the front panel controls 61 that a virtual cartridge is to be mounted.

(2) The user selects into which slot the virtual cartridge will be mounted. Upon selection of the slot, the name of the virtual cartridge then mounted in the slot, if any, is displayed.

(3) In response to (2), the data processor scans the ROM 70 for virtual cartridge identification information (virtual cartridge names).

(4) The data processor 10a causes the virtual cartridge names to be displayed on the front panel display 62. Depending upon the size of the front panel display 62, one or more virtual cartridge names may be displayed at once.

(5) The user selects a virtual cartridge. Of course, the virtual cartridge names can be scrolled until the desired virtual cartridge is located.

(6) In response to (5), the data processor 10a copies the virtual cartridge address into the Font List 51 in the memory 50a.

(7) The data processor 10a updates the Slot Table 54 to reflect the mounting of the virtual cartridge in the selected slot.

Initializing the Printer

In the second preferred embodiment, printer initialization includes steps for remounting previously mounted virtual cartridges to memory. As discussed, when a virtual cartridge is mounted, the Virtual Cartridge Management Logic updates the Slot Table 54 to reflect the selection. During initialization, the Virtual Cartridge Management Logic creates the Slot Table 54 and mounts the virtual cartridges selected as indicated in the Slot Table 54. Since turning off or resetting the printer would normally eliminate the Slot Table 54 in memory 50a, the values stored in the Slot Table 54 should also be stored in a non-volatile memory. It will be seen by those skilled in the art that the Slot Table 54 may also be implemented in non-volatile memory.

SUMMARY

In this way, address space that previously was occupied by fonts stored in ROMs in physical cartridges is occupied by virtual cartridge fonts stored on hard disks, in RAM, or in printer ROMs. Thus the virtual cartridge fonts emulate physical cartridge fonts. Once virtual cartridge fonts are listed in the Slot Table 54 and so available in the Font List 51, they are treated exactly as if they were actual cartridge fonts. No change need be made to the Print Management Logic.

It will thus be seen that the objects set forth above, and those made apparent from the preceding description, are efficiently attained. Since certain changes may be made without departing from the scope of the invention, it is intended that all matter contained in the above description shall be interpreted as illustrative and not in a limiting sense.

We claim:

1. A printer comprising:
   a non-volatile memory for storing fonts communicated from an external source;
   a volatile memory capable of storing a plurality of fonts selected from the fonts stored in the non-volatile memory, wherein the fonts stored in the volatile memory are capable of being prioritized relative to each other;
   a user input panel including:
   (i) means for enabling a user to select fonts stored in the non-volatile memory;
   (ii) means for enabling the user to determine the priority of the fonts selected from the non-volatile memory; and
   (iii) means for enabling the user to review the fonts selected from the non-volatile memory stored in the volatile memory;
   a data processor including a control program used by the data processor to manage printer operations, wherein the data processor under program control includes:
   (i) means for receiving fonts from an external source and storing the fonts in the non-volatile memory;
   (ii) means for storing in the volatile memory the fonts the user selected and information indicating the user selected priority of the fonts;
   (iii) means for receiving print data including font attributes from a device external to the printer;
   (iv) means for comparing the font attributes of the print data with the fonts stored in the volatile memory and determining which font stored in the volatile memory most closely approximates the attributes of the print data;
   (v) means for determining which font stored in the volatile memory has a higher priority relative to other fonts stored in the volatile memory should the font attributes of the print data most closely approximate more than one font stored in the volatile memory;
   (vi) means for selecting from the volatile memory the font most approximating the attributes of the print data having the highest priority should more than one font stored in the volatile memory most closely approximate the font attributes of the print data; and
   (vii) means for processing the print data and the font selected from the volatile memory to generate print commands; and
   a print mechanism for printing in response to the print commands from the data processor.

2. The printer of claim 1, wherein the user input panel further includes means for enabling the user to remove fonts selectively stored in the volatile memory.

3. The printer of claim 1, wherein the data processor further includes means for creating a table including a list of the user selected fonts stored in the non-volatile memory.

4. The printer of claim 1, wherein the data processor further includes a means for maintaining a copy of the user selected fonts in the non-volatile memory and a means for loading the previously selected user selected fonts stored in the non-volatile memory into the volatile memory during printer initialization.

5. The printer of claim 1, further including a memory for storing resident fonts, wherein the data processor further includes means to store in the volatile memory resident fonts and fonts downloaded from an external computer, wherein the resident fonts and downloaded fonts have a predetermined priority with respect to each other and the fonts selected by the user from the non-volatile memory.

6. A printer comprising:
   a memory storing resident fonts;
   a virtual cartridge memory storing a plurality of fonts;
   a volatile memory capable of storing fonts selected from the virtual cartridge memory, wherein the fonts stored in the volatile memory are capable of being prioritized relative to each other.
   a user input panel including:
      (i) means for enabling a user to select a font stored in the virtual cartridge memory;
      (ii) means for enabling the user to set the priority of the fonts selected from the virtual cartridge memory and
      (iii) means for enabling the user to review the fonts selected from the virtual cartridge memory stored in the volatile memory;
   a data processor including a control program used by the data processor to manage printer operations, wherein the data processor under program control includes:
      (i) means for storing in the volatile memory the fonts the user selected from the virtual cartridge memory and information indicating the user selected priority of the fonts;
      (ii) means for receiving print data including font attributes from a device external to the printer;
      (iii) means for comparing the font attributes of the print data with the fonts stored in the volatile memory and determining which font stored in the volatile memory most closely approximates the attributes of the print data;
      (iv) means for determining which font stored in the volatile memory has a higher priority relative to other fonts stored in the volatile memory should the font attributes of the print data most closely approximate more than one font stored in the volatile memory;
      (v) means for selecting from the volatile memory the font most closely approximating the font attributes of the print data having the highest priority should more than one font most closely approximate the font attributes of the print data; and
      (vi) means for processing the print data and the font selected from the volatile memory to generate print commands; and
   a print mechanism for printing in response to the print commands from the data processor.

7. The printer of claim 6, wherein the virtual cartridge memory is comprised of at least one ROM.

8. The printer of claim 6, wherein the virtual cartridge memory is comprised of at least one EEPROM which is capable of being electrically programmed to store specified fonts.

9. The printer of claim 6, wherein the virtual cartridge memory and memory storing resident fonts are comprised of a single memory device.

10. The printer of claim 6, wherein the volatile memory stores the virtual cartridge memory address of the selected font instead of the font information, and wherein the data processor accesses the font information stored in the virtual cartridge memory via the virtual cartridge memory address stored in the volatile memory.

11. The printer of claim 6, further including a non-volatile memory, wherein the data processor further includes means for maintaining a copy of the user selected fonts stored in the volatile memory in the non-volatile memory, and a means for loading the user selected fonts stored in the non-volatile memory into the volatile memory during printer initialization.

12. The printer of claim 6, wherein the data processor further includes means to store resident fonts and fonts downloaded from an external computer in the volatile memory, wherein the resident fonts and downloaded fonts have a predetermined priority with respect to each other and the fonts selected by the user from the non-volatile memory.

13. A printer controller for use in a printer having a non-volatile memory, volatile memory, user input panel, and printer mechanism, wherein the printer receives print data from an external source, comprising:
   means for receiving fonts from an external source and storing the fonts in the non-volatile memory;
   means for creating a table of the fonts stored in the non-volatile memory and communicating the table of fonts to the user via the user input panel;
   means for receiving user inputs from the user input panel indicating those fonts from the font table to load into the volatile memory and a priority of the selected fonts;
   means for receiving print data including font attributes from an external source;
   means for determining which font stored in the volatile memory most closely approximates the font attributes of the print data;
   means for determining which font stored in the volatile memory has a higher priority relative to other fonts stored in the volatile memory should the font attributes of the print data most closely approximate more than one font stored in the volatile memory and selecting the font stored in the volatile memory having the highest priority; and
   means for processing the print data and the font selected from the volatile memory to generate print commands.

14. The printer controller of claim 13 wherein the printer further includes a memory storing resident fonts, further including:
   means for maintaining a copy of the user selected fonts stored in the volatile memory in the non-volatile memory;
   means for loading the user selected fonts stored in the non-volatile memory into the volatile memory during printer initialization; and
   means for loading the resident fonts into the volatile memory during printer initialization.

15. A printer controller for use in a printer having a volatile memory, memory storing resident fonts, and a virtual cartridge memory storing a plurality of fonts, a user input panel, and a printer mechanism, wherein the printer receives print data from an external source, comprising:

means for communicating to the user via the user input panel the identity of the fonts stored in the virtual cartridge memory;

means for receiving user inputs from the user input panel indicating what fonts to select from the virtual cartridge memory and the priority of the selected fonts;

means for loading the selected fonts and information concerning the selected priority of the fonts into the volatile memory;

means for receiving print data including font attributes from an external source;

means for determining which font stored in the volatile memory most closely approximates the font attributes of the print data;

means for determining which font stored in the volatile memory has a higher priority relative to other fonts stored in the volatile memory should the attributes of the print data most closely approximate more than one font stored in the volatile memory and selecting the font having the highest priority; and means for processing the print data and the font selected from the volatile memory to generate print commands.

16. The printer controller of claim 15, wherein the printer further includes a non-volatile memory, further including:

means for maintaining a copy of the user selected fonts stored in the volatile memory in the non-volatile memory;

means for loading the user selected fonts stored in the non-volatile memory into the volatile memory during printer initialization; and means for loading the resident fonts into the volatile memory during printer initialization.

17. A method of managing fonts in a printer having a volatile memory, non-volatile memory, data processor, and a user input panel, comprising the steps of:

(a) the data processor receiving fonts from an external source and storing the fonts in a non-volatile memory;

(b) the data processor communicating to the user input panel a description of the fonts stored in the non-volatile memory;

(c) the data processor receiving from the user input panel user selected fonts from the fonts stored in the non-volatile memory and information concerning the priority of the selected fonts;

(d) the data processor loading the user selected fonts from the non-volatile memory into the volatile memory along with information indicating the priority of the user selected fonts; and (e) the data processor accessing the font information stored in the volatile memory when processing print data including font attributes received from an external source.

18. A method of managing fonts in a printer having a memory storing resident fonts, a virtual cartridge memory storing a plurality of fonts, a volatile memory, non-volatile memory, data processor, and a user input panel, comprising the steps of:

(a) the data processor loading resident fonts from the memory storing resident fonts into the volatile memory;

(b) the data processor communicating to the user input panel a description of the fonts stored in the virtual cartridge memory;

(c) the data processor receiving from the user input panel user selected fonts from the fonts stored in the virtual cartridge memory and information concerning the priority of the selected fonts;

(d) the data processor loading the user selected fonts from the virtual cartridge memory into the volatile memory along with information indicating the priority of the user selected fonts; and (e) the data processor accessing the font information stored in the volatile memory when processing print data including font attributes received from an external source.

* * * * *